United States Patent [19]

Dorner

[11] Patent Number: 4,534,529
[45] Date of Patent: Aug. 13, 1985

[54] SHELF BRACKET AND COOPERABLE LOCKING BRACKET RETAINER

[76] Inventor: Steven C. Dorner, 5322 Fair Elms Ave., Western Springs, Ill. 60558

[21] Appl. No.: 503,668

[22] Filed: Jun. 13, 1983

[51] Int. Cl.³ .............................................. F16L 3/08
[52] U.S. Cl. .................. 248/222.1; 108/108
[58] Field of Search ................ 248/235, 222.1, 220.2, 248/222.2, 223.1, 243.1, 245.1, 544; 108/108; 211/192, 193

[56] References Cited

U.S. PATENT DOCUMENTS

| | | | |
|---|---|---|---|
| 3,836,009 | 9/1974 | Horowitz | 248/235 |
| 4,048,768 | 9/1977 | Good | 248/243 |
| 4,154,419 | 5/1979 | Breidebach | 248/243 |
| 4,274,614 | 6/1981 | Worrallo | 248/243 |
| 4,299,367 | 11/1981 | Harlan | 248/235 |
| 4,324,379 | 4/1982 | Ovitz | 248/243 |
| 4,421,289 | 12/1983 | Sturm | 108/108 |
| 4,444,321 | 4/1984 | Carlstrom | 248/235 |
| 4,456,211 | 6/1984 | Wyckoff | 248/235 |

Primary Examiner—William H. Schultz
Assistant Examiner—Ramon O. Ramirez

[57] ABSTRACT

A support bracket is mounted to a vertical wall structure which includes an inner surface and a plurality of spaced slots through the use of a bracket retainer. The bracket has a pair of L-shaped projections extending from its proximal end for hooking through respective slots. Each of the projections includes an edge facing the distal end of the bracket. A recess is provided in the bracket and has a locking edge extending at a downwardly convergent angle with respect to the proximal end of the bracket. The bracket retainer has first and second spaced plates interconnected by a wedge-shaped structure which has a locking surface complemental to the locking edge. The bracket is received between the plates and the locking surface engages the locking edge to force the edges of the L-shaped projections against the inner surface of the wall structure in response to a tap on one end of the retainer.

5 Claims, 3 Drawing Figures

U.S. Patent  Aug. 13, 1985  4,534,529
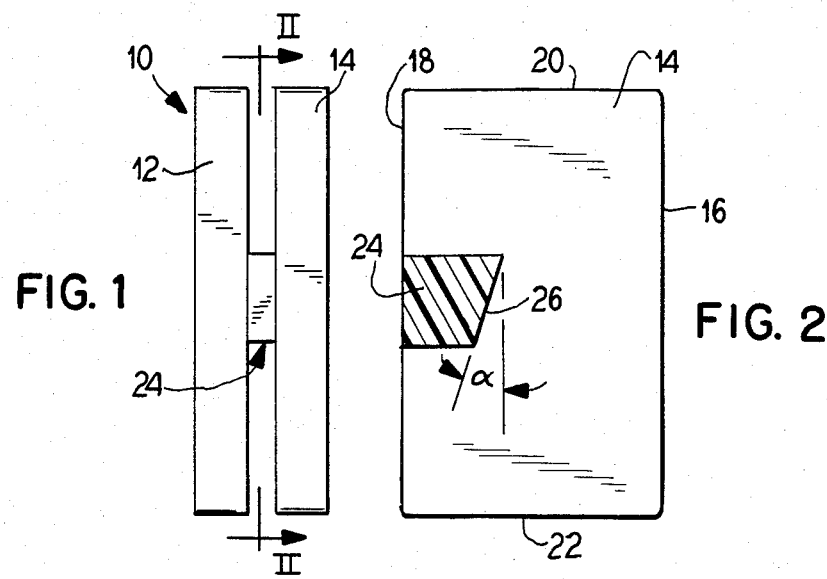
FIG. 1
FIG. 2
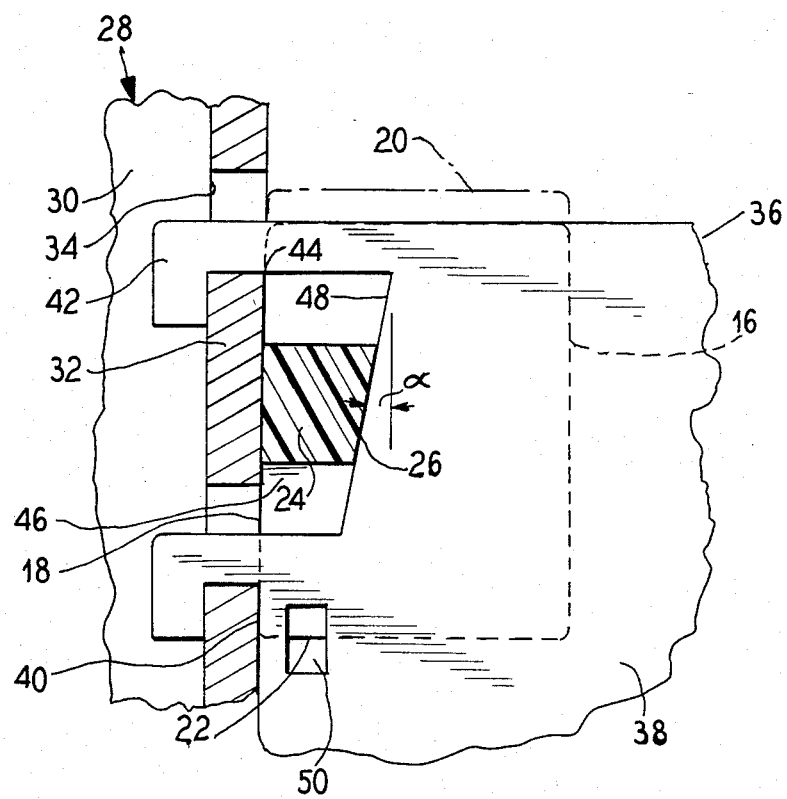
FIG. 3

SHELF BRACKET AND COOPERABLE LOCKING BRACKET RETAINER

BACKGROUND OF THE INVENTION

1. Field of the Invention

The present invention relates to shelf structures and is more particularly concerned with a shelf bracket and a cooperable locking bracket retainer for positive, quick and easy securement of the shelf bracket to a slotted wall structure including a visible slotted wall standard or a hidden slotted wall standard as may be used in merchandising display hardware.

2. Description of the Prior Art

Present structures of providiing a tight fit of a shelf bracket to a wall standard are very ineffective and frequently loosen and permits shelf brackets to slip out of the slotted standards. This causes spilling of merchandise, damage and possible injury to persons standing nearby. These devices include cam locks, thumb screw tighteners and taptight fits.

SUMMARY OF THE INVENTION

The object of the present invention is to provide a new and improved structure for locking a shelf bracket to a slotted wall structure and prevent the same from moving up out of the wall standard and maintaining the bracket from swaying from side-to-side, particularly when long shelf brackets are used.

The above object is achieved through the provision of a bracket which comprises a support member for supporting an article thereon and having a pair of L-shaped projections extending from its proximal end for hooking through respective ones of the slots of a slotted wall structure to locate the proximal end against the wall structure. A recess is provided in the proximal end and includes a locking edge extending at a downwardly convergent angle with respect to the proximal end. A bracket retainer comprises a pair of spaced parallel plates wich receive the support bracket therebetween. A locking member extends between the plates and includes a locking surface which is complemental to the locking edge. The locking surface and locking edges engage and wedge the proximal end against the wall structure when the upper end of at least one of the spaced plates is tapped.

The bracket may also be provided with an unlocking aperature located adjacent the bottom end of the bracket retainer for receiving a prying tool, for example a screwdriver, to release the locking member.

BRIEF DESCRIPTION OF THE DRAWING

Other objects, features and advantages of the invention, its organization, construction and operation will be best understood from the following detailed description, taken in conjunction with the accompaying drawing, on which:

FIG. 1 is a front end view of a bracket retainer constructed in accordance with the present invention;

FIG. 2 is a sectional view taken substantially along the parting line II—II of FIG. 1 and providing an exaggerated showing of the locking surface; and FIG. 3 is a sectional view similar of FIG. 2 and also showing a cooperable shelf bracket mounted in a slotted wall standard.

DESCRIPTION OF THE PREFERRED EMBODIMENTS

Referring to the drawing, a bracket retainer is generally illustrated at 10 as comprising a pair of parallel plates 12, 14 which are spaced apart and connected together by way of a locking member 24. Each of the plates 12, 14 has a forward edge 16, a rear edge 18, an upper edge 20 and a lower edge 22.

As seen in FIG. 2, the locking member 24 has a surface 26 which extends at an angle $\alpha$ from vertical, the term vertical being used here in the sense that the device is employed in the vertical orientation shown on the drawing. The angle $\alpha$ is in the range of 7°–10°.

The bracket retainer may be constructed of steel or a durable, strong plastic material, such as teflon-nylon or hard rubber.

Referring to FIG. 3, the bracket retainer is illustrated along with a shelf bracket and typical wall standard.

The wall standard may be U-shaped elongate structure 28, here shown in section so that only one leg 30 is illustrated. The base 32 of the U-shaped structure comprises a plurality of spaced slots 34. A shelf bracket 36 comprises a generally flat member 38 having a proximal end 40 and at least two L-shaped projections 42 extending from said proximal end. As shown, in use the L-shaped projections are moved through the slots and down so that their forward facing edges 44 lie behind the inner surface of the base 32.

The bracket is provided with at least one recess 46 between the L-shaped members 42, the recess 46 having a locking edge 48 extending downwardly convergent with respect to the proximal end 40 of the bracket, at the angle $\alpha$. As shown, clearance is provided for up and down movement of the locking wedge.

It will be noted that the upper end of the retainer 10 may lie above the upper edge of the shelf bracket prior to wedging, as shown in phantom, to facliatate access and to receive a slight downward tap to effect the wedging action. When installed, the retainer forces the bracket 36 in the direction of its distal end and forces the edges 44 tightly against the inner surface of the standard.

The bracket retainer may be released by applying a sharp blow to the bottom side of the bracket. As an alternative, the bracket may be provided with an aperture 48 which is disposed for access to the lower edge 22 of the retainer. A screwdriver, for example, may then be employed to pry the retainer up to unlock the structure. The retainer cannot be accidentally moved up because of the weight of the shelf and the shelf contents which provide an added holding power and safety of the locking feature.

In summary, the present invention permits larger recesses in the shelf bracket and eliminates costly, fragile and expensive punch press tool and die parts. The present shelf brackets that are dependent on small taper fits for securing the shelf brackets to slotted wall standards often have poor performance and much down time due to the small and fragile die components must be maintained at considerable expense. The components of the shelf bracket hooks can be made substantially stronger at the correct places, thus making the shelf bracket stronger than the present conventional shelf brackets.

I claim:

1. In combination, a support bracket and a bracket retainer for mounting on a vertical wall structure which includes a member having an inner surface and a plurality of spaced slots therethrough, said bracket comprising a support member for supporting an article thereon, a proximal end, a distal end, a pair of L-shaped projections extending from said proximal end for hooking through respective ones of slots, each of said projections including an edge facing said distal end, and means defining a recess in said bracket including a locking edge extending at a downwardly convergent angle with respect to said proximal end, and said bracket retainer comprising at least one first member plate for engaging the wall structure including an end, and a second member connected to said plate including a locking surface complemental to and for engaging said locking edge, and effective to wedge said edges of said L-shaped projections against the inner surface of the wall structure in response to a tap on said end.

2. In combination, a support bracket and a bracket retainer for mounting on a vertical wall structure which includes a member having an inner surface and a plurality of spaced slots therethrough, said bracket comprising a support member for supporting an article thereon, a proximal end, a distal end, a pair of L-shaped projections extending from said proximal end for hooking through respective ones of the slots, each of said projections including an edge facing said distal end, and means defining a recess in said bracket including a locking edge extending at a downwardly convergent angle with respect to said proximal end, and said bracket retainer comprising a pair of spaced parallel plates for engaging said wall structue and receiving said support bracket therebetween and each including an end, and a locking member connected between said plates including a locking surface complemental to and for engaging said locking edge, and effective to wedge said edges of said L-shaped projections against the inner surface of the wall structure in response to a tap on said end.

3. In combination, a support bracket and a bracket retainer for mounting on a vertical wall structure which includes a member having an inner surface and a plurality of spaced slots therethrough, said bracket comprising a support member for supporting an article thereon, a proximal end, a distal end, a pair of L-shaped projections extending from said proximal end for hooking through respective ones of the slots, each of said projections including an edge facing said distal end, and means defining a recess in said proximal end including a locking edge extending at a downwardly convergent angle with respect to said proximal end, and said bracket retainer comprising a pair of spaced parallel plates for engaging said wall structure and receiving said support bracket therebetween and each including an upper end, and a locking member connected between said plates including a locking surface complemental to and for engaging said locking edge, and effective to wedge said edges of said L-shaped projections against the inner surface of the wall structure in response to a tap on said upper end.

4. The combination of claim 3, wherein:
said bracket comprises an upper edge; and
said upper end of said bracket retainer extends above said upper edge prior to locking to facilitate access thereto.

5. The combination of claim 3, wherein:
said bracket comprises means defining an unlocking aperature therethrough located at said lower edge of lower edges for receiving a prying tool to release the locking of said locking member.

* * * * *